United States Patent [19]

Yamamoto

[11] Patent Number: 4,846,583

[45] Date of Patent: Jul. 11, 1989

[54] ELECTRONIC CLINICAL THERMOMETER

[75] Inventor: Norihito Yamamoto, Shiga, Japan

[73] Assignee: Omron Tateisi Electronics Co., Japan

[21] Appl. No.: 928,360

[22] Filed: Nov. 10, 1986

[30] Foreign Application Priority Data

Nov. 11, 1985 [JP] Japan .............................. 60-173870[U]

[51] Int. Cl.$^4$ ............................................. G01K 7/00
[52] U.S. Cl. ..................................... 374/163; 374/170
[58] Field of Search .......................... 128/736; 364/557; 374/163, 169, 170

[56] References Cited

U.S. PATENT DOCUMENTS 4,565,456  1/1986  Iida et al. ............................. 374/169
4,691,713  9/1987  Suzuki ................................... 128/736

FOREIGN PATENT DOCUMENTS 36926  2/1985  Japan .................................... 374/163
 2029  1/1986  Japan .................................... 374/163
 3018  1/1986  Japan .................................... 128/736

Primary Examiner—Allan N. Shoap
Assistant Examiner—W. Morris Worth
Attorney, Agent, or Firm—Wegner & Bretschneider

[57] ABSTRACT

An electronic clinical thermometer which computes a predicted body temperature value from a series of temperature data generated during a given time period, displays the predicted value for a given time in the course of body temperature measurement and, then, has the predicted value display superceded by a measured temperature display. This clinical thermometer comprises an alerting means for alerting the user at displaying of said predicted value to the fact that the value to be displayed is a predicted body temperature value, a time for terminating the predicted value display long before measured temperature values reach a steady state, and a display shift means which compares the measured value at determination of the predicted value with the measured value at completion of the predicted value display and supercedes the predicted value display with a measured value display on condition that the measured value at completion of the predicted value display is at least equal to the measured value at determination of the predicted value.

2 Claims, 5 Drawing Sheets

ELECTRONIC CLINICAL THERMOMETER

BACKGROUND OF THE INVENTION

1. Field of the Invention

This invention relates to an electronic clinical thermometer which displays a predicted body temperature value for a brief time soon after commencement of determination, then compares the measured values before and after display of said predicted value, and on condition that the latter measured value is higher than the former measured value, causes the predicted value display to be superceded by a measured value display.

2. Description of the Prior Art

The clinical thermometer of predicted value display type is available in various constructions. These thermometers basically employs the display system shown in FIG. 5.

For about 30 seconds after commencement of measurement, the continually increasing measured temperature is displayed on the display area of the thermometer and upon lapse of said 30 seconds, the predicted body temperature is determined from the measured temperature data according to the exponential function computation formula and this predicted value is displayed on the display area. Then, while this predicted value display is on for 3 to 5 minutes, it is automatically superceded by the display of the measured value upon lapse of a display time of say, 5 minutes.

The above conventional electronic clinical thermometer is set so that the display of the predicted value is continued until the measured value reaches a steady state, that is, the broken line (measured temperature) in FIG. 5 acquires a substantially horizontal grade (3 to 5 minutes) with an infinite series of temperature values coming to have a finite value and, then, is replaced with a display of measured values. Therefore, by the time of this replacement with the measured value, the final measured temperature has increased to a level substantially equal to the predicted value. On the other hand, one who takes the body temperature may wish to know an approximate result of temperature measurement at an early time or wish to know an exact result. Or he may wish to know both.

However, the conventional clinical thermometer involving a long predicted value display time is inconvenient in use, for it does not provide information on the steadily increasing body temperature and, moreover, as there is little difference between the predicted temperature value and the measured temperature value displayed in lieu of the predicted value, one may not be certain whether the current display is indicative of the measured temperature or not.

SUMMARY OF THE INVENTION

It is the object of the present invention to overcome the above-mentioned disadvantages of the prior art clinical thermometer and provides an electronic clinical thermometer which informs to one taking the body temperature that the currently indicated temperature is a predicted body temperature and, after a brief display of the predicted value, shifts to a measured value display, so that one taking the body temperature may know not only the predicted temperature but also the exact result of body temperature measurement.

DETAILED DESCRIPTION OF THE INVENTION

The above-mentioned object has been accomplished by the present invention which provides an electronic clinical thermometer having the following construction.

The electronic clinical thermometer according to the present invention is adapted to compute a predicted body temperature value from body temperature information generated by measurement over a predetermined time, displays the predicted body temperature so computed for a given time as it keeps measuring the body temperature and, then, display the measured value, and comprises an alerting means such that when said predicted temperature value is displayed, it alerts one taking the body temperature that the temperature on display is a predicted temperature, a timer for terminating the predicted temperature display before the measured value reaches a steady state, and a display changeover means which compares the measured value at computation of said predicted value with the measured value at the end of the predicted value display and performs the display of measured values only when the measured value at the end of the predicted value display is equal to or higher than the measured value at computation of the predicted value.

Figure 1:
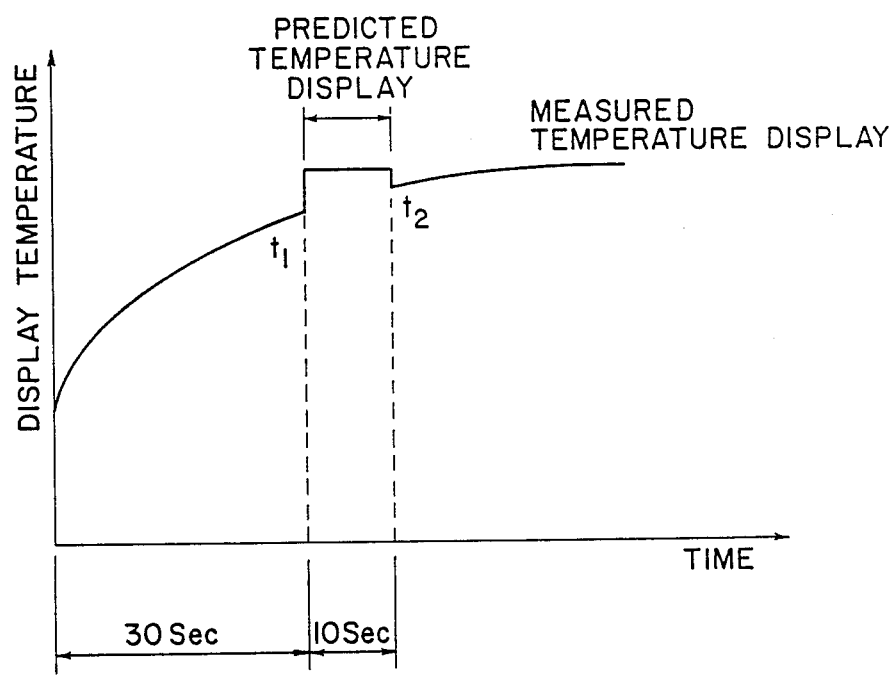
FIG. 1 is a diagrammatic view illustrating the principle of body temperature determination and display according to the present invention.

As illustrated in FIG. 1, an electronic clinical thermometer of the above construction functions in such a manner that measured values are displayed on the display area during 30 seconds after commencement of measurement and at completion of the above 30-second period the predicted body temperature value is displayed. At the same time, a buzzer goes out to indicate that the temperature which is now displayed is the predicted value, thus allowing the one taking the body temperature to know the predicted body temperature at an early time.

At this stage, one taking the body temperature may select one of the following two alternatives: to complete the taking of body temperature by removing the sensor from the armpit or under the tongue or to have the measured value display. The predicted value display is executed for a brief time (10 seconds), and at the end of this display time, the measured values before and after the display are compared. If he discontinues to take the body temperature, that is to say he detaches the sensor from the body, upon appearance of the predicted value display, the measured value falls below the temperature reading prior to the display, whereupon it is sensed that he discontinued taking of body temperature and accordingly the measured value display is not executed. However, when the measured value after completion of said display is the same as or higher than the temperature prior to display, it is judged that one taking the body temperature is still continuing the body temperature detection procedure and a switchover is thereupon made to the measured value display, whereby the continually incremental peak temperature value is displayed. In this manner, one taking the body temperature has the liberty to choose whichever of the two alternatives, namely learning the predicted body temperature and being satisfied or performing the usual body temperature measurement, according to the object of body temperature determination.

PREFERRED EMBODIMENTS

Figure 2:
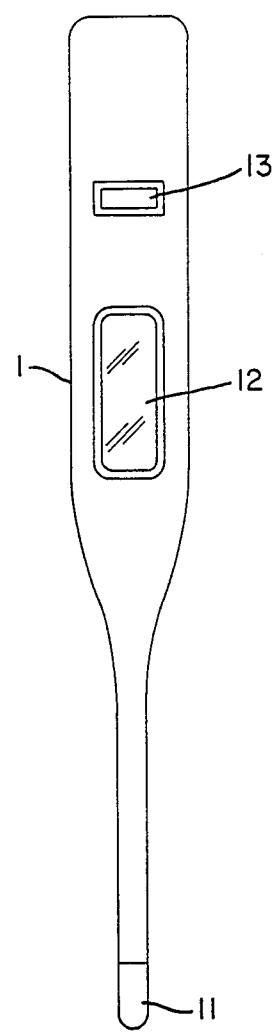
FIG. 2 is a plan view showing an electronic clinical thermometer embodying the principle of the present invention.

Referring to FIG. 2 which is a plan view showing an embodiment of the electronic clinical thermometer according to the present invention, the electronic clinical thermometer generally comprises a body casing 1, a temperature sensor 11, which may for example be a thermister, projecting from the tapered end of the body casing 1, a display unit 12 disposed in an approximate center of the casing 1 for displaying the results of body temperature determination (predicted values and measured values), and a power switch 13 for starting or stopping the temperature determination.

Figure 3:
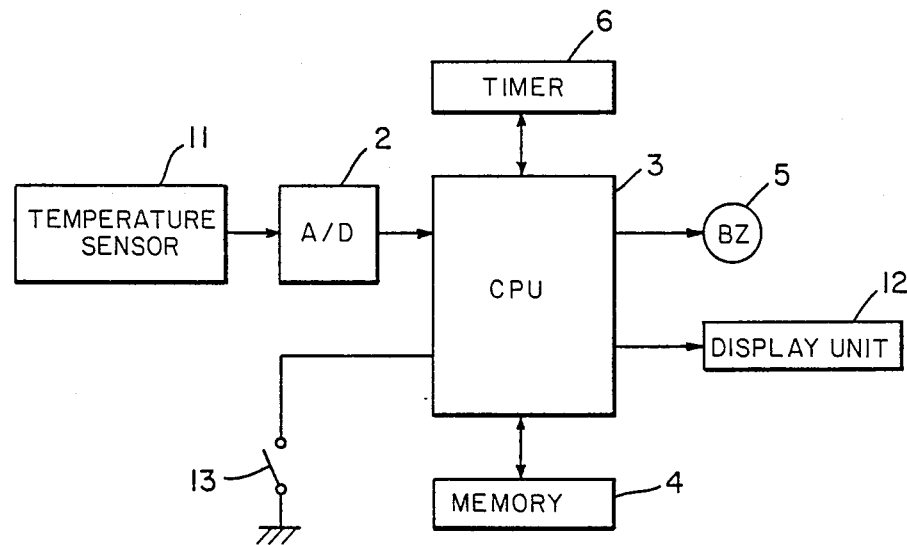
FIG. 3 is a block diagram showing an exemplary circuit for the electronic clinical thermometer according to the present invention.

FIG. 3 shows a circuit diagram for the above electronic clinical thermometer.

A temperature sensor 11 detects the body temperature in the sublingual region or the armpit which it contacts and picks up an electric signal corresponding to the temperature. In an A/D converter, the temperature information (analog information) generated with the progress of time is converted to digital information, which can be better processed by a CPU (central processing unit) 3, and fed to the CPU.

From the temperature information fed to the CPU 3, the CPU 3 selects and stores the necessary data in a memory 4 and computes a predicted body temperature value from the temperature information, causes the display unit to display the predicted value, and drives a buzzer 5. The CPU further drives a timer 6 and, at the end of the predicted value display, compares the measured values before and after the display, executes switchover control to replace the predicted value display with a measured value display.

It should be understood that while the buzzer 5 is used as a predicted value display alerting means in the above embodiment, the invention is not limited to such means. Rather, the temperature display may be a flicker display or the buzzer sound may be made continual and lasting throughout the display period.

Figure 4:
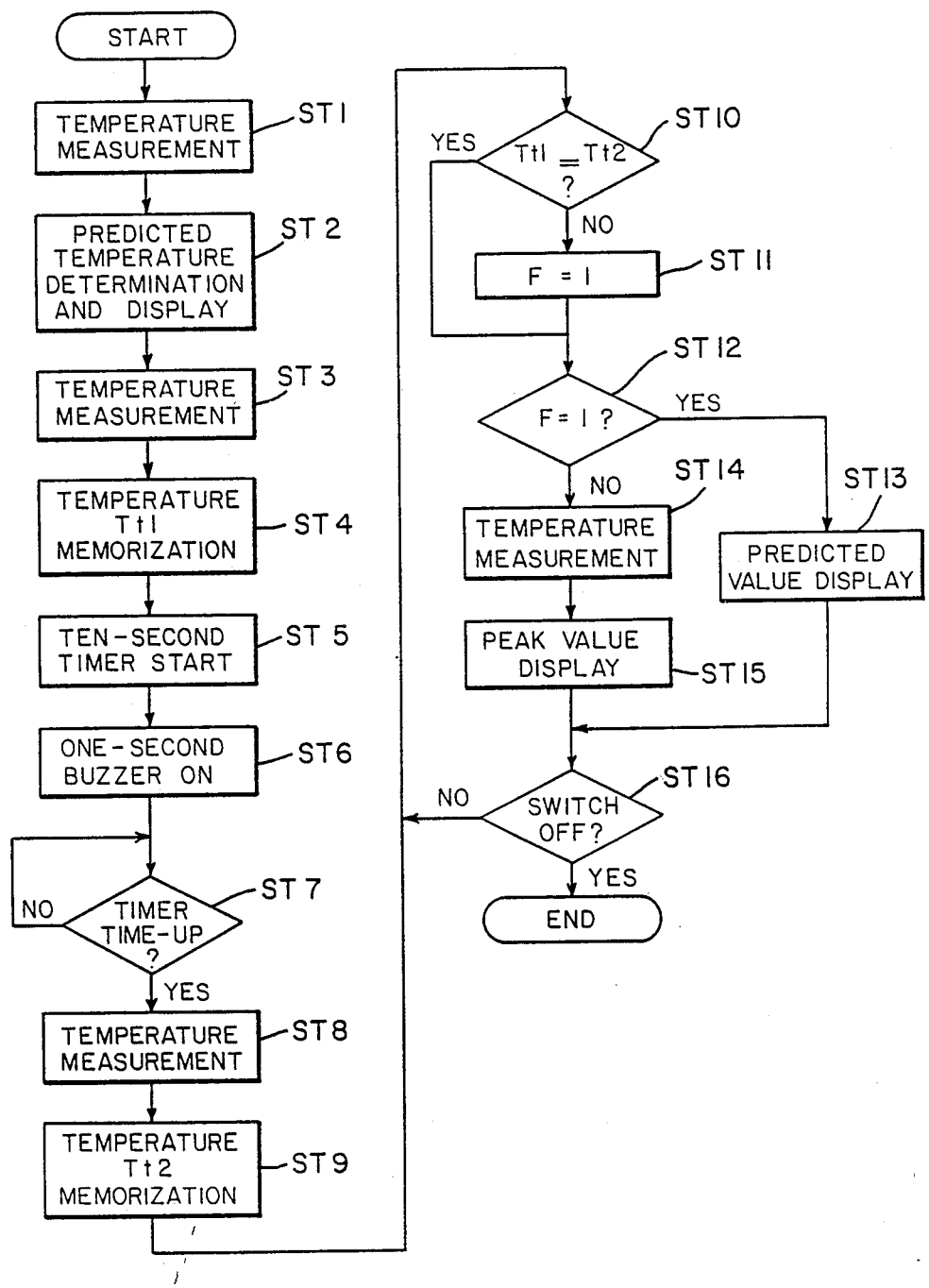
FIG. 4 is a flow chart illustrating the sequence of body temperature determination operations according to the present invention.
Figure 5:
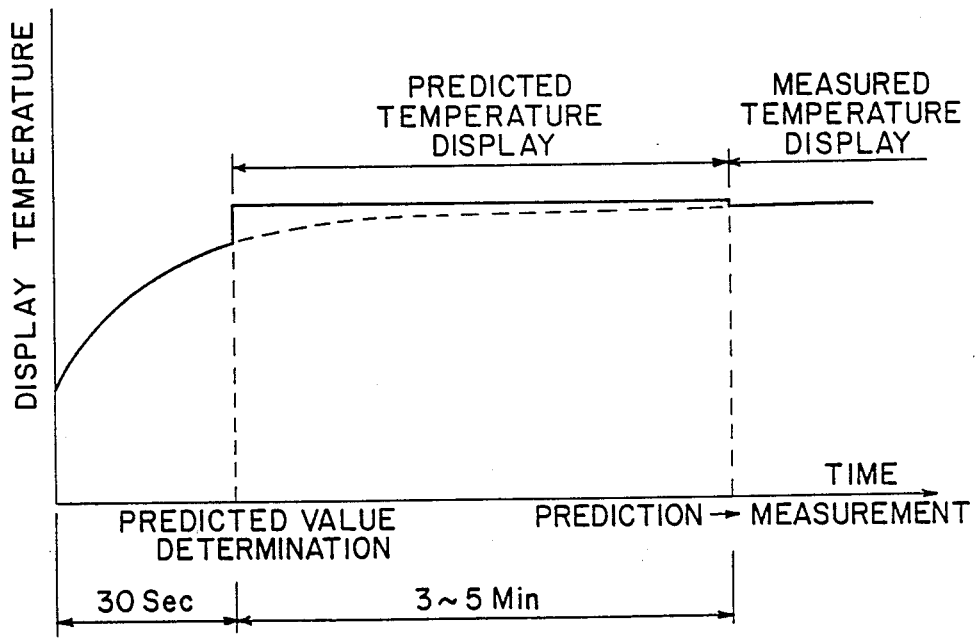
FIG. 5 is a diagrammatic view showing the principle of body temperature determination and display in the conventional clinical thermometer of predicted value display type.

FIG. 4 is a flow chart showing the operation of the electronic clinical thermometer.

When one taking the body temperature sets the temperature sensor 11 in position, for example under the arm, and turns the power switch 13 on, the sensor 11 begins to measure the body temperature (Step 1; hereinafter referred to as ST 1). Referring to FIG. 1, when this body temperature measurement has proceeded for 30 seconds, the CPU 3 computes a predicted body temperature value from the incremental temperature data and indicates the predicted value on the display unit 12 (ST 2). At the same time, CPU 3 drives the buzzer 5, notifying that the temperature now to be displayed is the predicted value (ST 6) and also drives the timer 6 which sets a display time (10 seconds) for the predicted value (ST 5). This 10-second time for display of the predicted value is a very short time as compared with the time (3 to 5 minutes) which it takes for measured values to establish a steady state.

Further in synchronization, the measured temperature $Tt_1$ determined immediately before this predicted value display (ST 3) is stored in the memory 4 (ST 4).

If one taking the body temperature is desirous of knowing an approximate body temperature as soon as possible, he may look to the display area of the thermometer for the predicted value at buzzer sounding and be thereby satisfied. Then, he removes the sensor 11 from the armpit to discontinue taking the body temperature. On the other hand, if what he wants to know is the exact body temperature, he continues the temperature detection procedure with the sensor 11 kept in position under the arm.

At ST 7, it is inquired if the 10-second time for predicted value display has elapsed, if this 10-second time has run out, the judgement in ST 7 becomes YES and the temperature is measured (ST 8). The measured value $Tt_2$ after counting up of the 10-second display time is stored in the memory 4 (ST 9). In ST 10, it is inquired if $Tt_2$ is equal to or larger than $Tt_1$.

If one taking the body temperature was satisfied with the predicted value and discontinued the body temperature detection procedure, $Tt_2$ has by now dropped below $Tt_1$ so that the judgement in ST 10 is NO, whereupon a flag 1 appears in ST 11. Accordingly the judgement in ST 12 is YES and the thermometer keeps displaying the predicted value until the power switch 13 is turned off (ST 13). On the other hand, if one taking the body temperature wants to know the accurate determination and continues the body temperature detection procedure after the predicted value display, $Tt_2$ is in an increasing tendency and in excess of $Tt_1$, so that the judgement in ST 10 is YES and that in ST 12 is NO. As a result, the predicted value display is superceded by the measured value display. The temperature determination is further executed (ST 14), the incremental temperature peak value is displayed (ST 15), and this body temperature display is continued until the power switch 13 is turned off (ST 16).

Thus, the clinical thermometer according to the present invention alerts the user by means of a buzzer sound that the current display is a predicted value display, terminates this predicted value display long before measured body temperature values establish a steady value, compares the measured values before and after the predicted value display, and replaces the predicted value display with a measured value display only when the measured value after the predicted value display is equal to or higher than the measured value after said display.

In accordance with the present invention, one taking the body temperature is not only allowed to know an estimated body temperature at an early time after commencement of body temperature determination as prompted by the alerting sound of a buzzer but also allowed to select one of the alternatives of discontinuing the temperature detection procedure by mere removal of the sensor from the armpit or carrying through the temperature detection procedure by keeping the sensor in position.

Furthermore, as the duration of the predicted value display is very brief in the present invention, the measured temperature value at the end of the predicted value display is still on the increase. Therefore, if one taking the body temperature wants to continue the temperature detection procedure after the end of the predicted value display, he can ascertain the change in increasing body temperature by performing the ordinary body temperature determination, which could not be made with the prior art prediction type clinical thermometer. Thus, the present invention offers a variety of advantages over the prior art clinical thermometer having the predicted value display function.

What is claimed is:

1. An electronic clinical thermometer adapted to compute a predicted body temperature value from a series of temperature data generated during a given time period, provide a display of the predicted value for a given time period in the course of body temperature measurement and, then, have the predicted value display superceded by a measured temperature display, which comprises:

means for sensing a plurality of body temperature measurement values over a predetermined time period and producing a series of temperature data therefrom, means for generating a predicted temperature value from said series of temperature data, display means for displaying one of said predicted temperature value and said body temperature measurement value of said sensing means, alerting means for alerting one taking the body temperature upon display of said predicted value that the value to be displayed is a predicted body temperature value, timer means for terminating the predicted value display at a time long before the body temperature measurement values reach a steady state, and display shift means adapted to compare the body temperature measurement value at determination of said predicted value with the body temperature measurement value at completion of said predicted value display and supercede the predicted value display with a body temperature measurement value display on condition that the body temperature measurement value at completion of the predicted value display is equal to or higher than the body temperature measurement value at determination of the predicted value.

2. An electronic clinical thermometer according to claim 1 wherein said alerting means is a buzzer which sounds at commencement of said predicted value display.

* * * * *